United States Patent [19]
Whittenberger et al.

[11] Patent Number: 5,791,044
[45] Date of Patent: Aug. 11, 1998

[54] ASSEMBLY AND METHOD FOR CATALYTIC CONVERTER STRUCTURES

[75] Inventors: William A. Whittenberger, Leavittsburg; Gordon W. Brunson, Chagrin Falls; Boris Y. Brodsky, Mayfield Heights, all of Ohio

[73] Assignee: Engelhard Corporation, Iselin, N.J.

[21] Appl. No.: 720,413

[22] Filed: Sep. 30, 1996

Related U.S. Application Data

[62] Division of Ser. No. 557,617, Dec. 22, 1995.

[51] Int. Cl.$^6$ .................................................. B21D 11/06
[52] U.S. Cl. .......................... 29/890; 422/177; 422/180; 502/439; 502/527.24; 502/527.22; 428/592
[58] Field of Search .................................. 422/171, 177, 422/180, 211, 222; 502/439, 527, 527.22, 527.24; 29/890; 60/299; 428/116, 593, 594, 592, 603, 287

[56] References Cited

U.S. PATENT DOCUMENTS 3,966,646  6/1976  Noakes et al. .................. 502/439
5,342,588  8/1994  Humpolik ........................ 502/527
5,366,700  11/1994  Humpolik et al. ............... 422/180

FOREIGN PATENT DOCUMENTS 322566  7/1989  European Pat. Off. .
613997  9/1994  European Pat. Off. .

Primary Examiner—Hien Tran

[57] ABSTRACT

A metal foil leaf assembly for catalytic converters, the leaf assembly including at least two juxtaposed foil leaves, each having opposite ends to establish a leaf length and at least one corrugated leaf segment shorter than the leaf length. At least one of the opposite ends is joined by appropriate technique, such as welding, brazing, or folding. The leaf assembly is incorporated in catalytic converter body having a cylindrical jacket tube. A plurality of radiating foil leaves extend in adjacent curved paths and are joined at the outer ends thereof to the jacket tube. The foil leaves define fluid passage cells between juxtaposed flat and corrugated leaf segments, and each of the foil leaves has at least one corrugated segment.

2 Claims, 4 Drawing Sheets

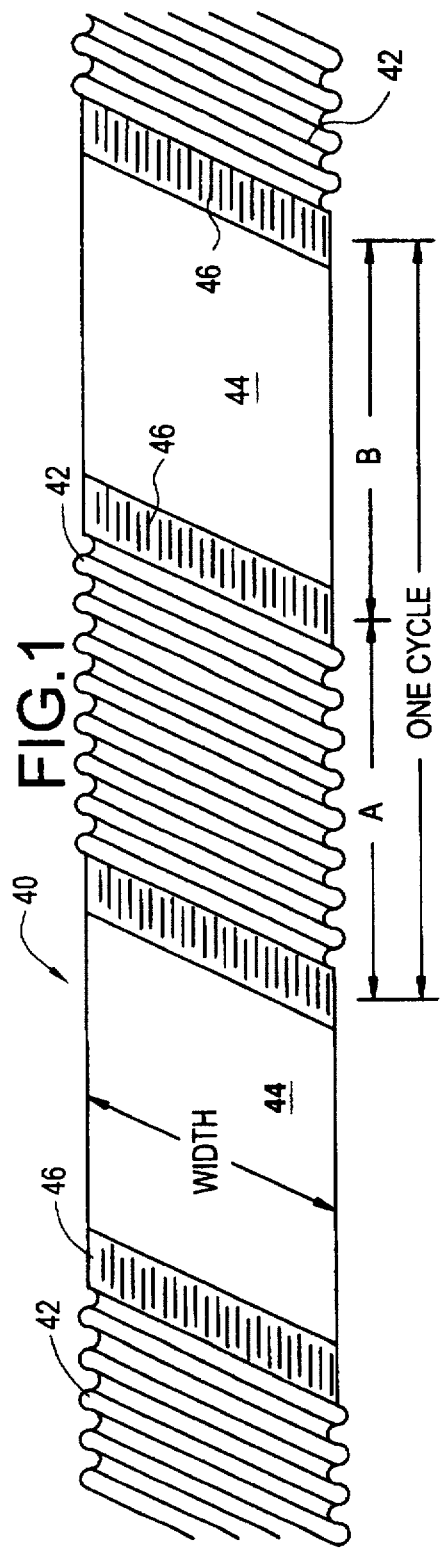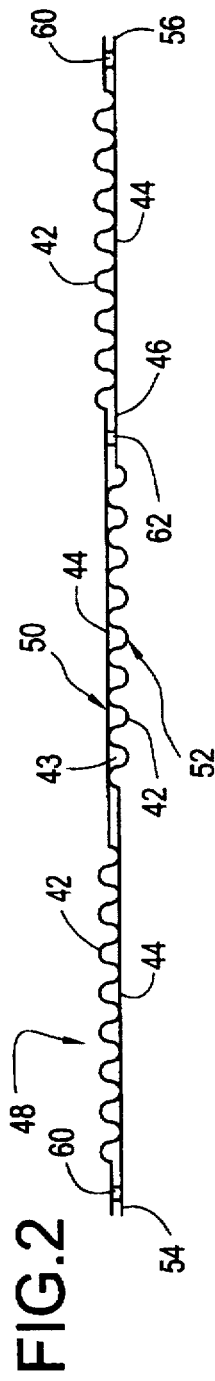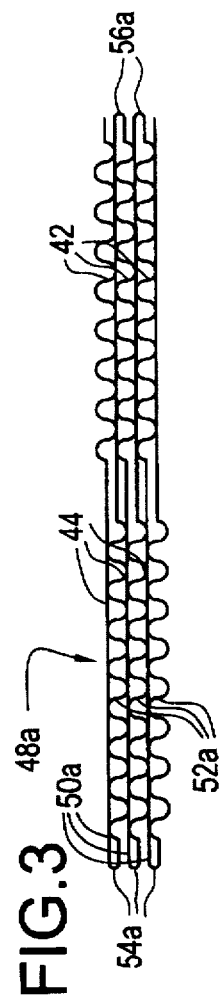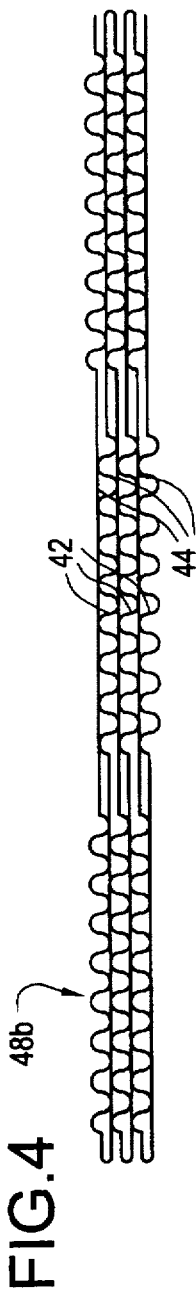

2 CYCLE SPIRAL
70
48e
48c
48d
1.5 CYCLE SPIRAL
1 CYCLE SPIRAL 48
72
70a

ASSEMBLY AND METHOD FOR CATALYTIC CONVERTER STRUCTURES

This is a division of application Ser. No. 08/577,617, filed Dec. 22, 1995.

CROSS REFERENCE TO RELATED APPLICATIONS

The present application is related to U.S. application Ser. No. 08/501,755, filed Jul. 12, 1995 by David T. Sheller and William A. Whittenberger, and to concurrently filed U.S. applications, entitled Assembly and Method for Making Catalytic Converter Structures, as follows: Ser. No. 08/577,616 by William A. Whittenberger, John J. Chlebus, Joseph E. Kubsh, and Boris Y. Brodsky; Ser. No. 08/580,101 by David T. Sheller and William A. Whittenberger; Ser. No. 08/577,618 by William A. Whittenberger and Boris Y. Brodsky; Ser. No. 08/580,102 by David T. Sheller, Steven Edson and William A. Whittenberger; Ser. No. 08/577,615 by William A. Whittenberger, David T. Sheller, and Gordon W. Brunson; Ser. No. 08/577,619 by David T. Sheller, William A. Whittenberger and Joseph E. Kubsh; and Ser. No. 08/580,103 by William A. Whittenberger and Gordon W. Brunson; The complete disclosure of all of these applications are incorporated herein by reference.

BACKGROUND OF THE INVENTION

1. Field of the Invention

The present invention relates to metallic catalytic converter bodies, and, more particularly, to metal foil leaf assemblies and converter bodies incorporating such assemblies.

2. Description of the Related Art

Catalytic converters containing a corrugated thin metal (stainless steel) monolith typically have been formed of a plurality of thin metal strips or foil leaves wound about a central pin or about spaced "fixation" points. Such prior catalytic converters bodies, have supported both the outer and inner end of the individual layers by fixing them to the housing for the converter body and a central pin or post. In certain instances, the interior support has been provided by looping the foil leaves about a fixed point or portion whereby the inner ends of the leaves have been supported by other foil leaves. The thin metal strips or leaves forming the multicellular honeycomb body also have been brazed together at points intermediate the ends to form a rigid honeycomb monolith. Various techniques such as soldering, welding, brazing, riveting, clamping, reverse wrapping or folding, or the like, have been used to secure the inner and outer ends, and usually the intermediate portion, of the leaves or strips to the support member. While many techniques have been used to assemble the leaves into the housing and many leaf arrangements have been constructed, many arrangements have been unable to survive severe automotive industry tests known as the Hot Shake Test, the Hot Cycling Test, combinations of these tests, cold vibration testing, water quench testing, and impact testing.

The Hot Shake test involves oscillating (50 to 200 Hertz and 28 to 80 G inertial loading) the device in a vertical, radial or angular attitude at a high temperature (between 800 and 1050 degrees C.; 1472 to 1922 degrees F., respectively) with exhaust gas from a gas burner or a running internal combustion engine simultaneously passing through the device. If the device telescopes, or displays separation or folding over of the leading or upstream edges of the foil leaves, or shows other mechanical deformation or breakage up to a predetermined time, e.g., 5 to 200 hours, the device is said to fail the test.

The Hot Cycling Test is run with exhaust flowing at 800 to 1050 degrees C.; (1472 to 1922 degrees F.) and cycled to 120 to 200 degrees C. once every 13 to 20 minutes for up to 300 hours. Telescoping or separation of the leading edges of the thin metal foil strips, or mechanical deformation, cracking or breakage is considered a failure.

Also, the Hot Shake Test and the Hot Cycling Test are sometimes combined, that is, the two tests are conducted simultaneously or superimposed one on the other.

The Hot Shake Test and the Hot Cycling Test are hereinafter called "Hot Tests." While they have proved very difficult to survive, the structures of the present invention are designed to survive these Hot Tests and other tests similar in nature and effect that are known in the industry.

From the foregoing, it will be appreciated that catalytic converter bodies and their method of manufacture have received considerable attention, particularly by the automotive industry, are complex in design and manufacture, and are in need of improvement.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention comprises a metal foil leaf assembly for catalytic converters, the leaf assembly including at least two juxtaposed foil leaves, each having opposite ends to establish a leaf length and at least one corrugated leaf segment shorter than the leaf length. At least one of the opposite ends is joined by appropriate means, such as a weld, braze, or fold.

In another aspect, the advantages and purpose of the invention are attained by a catalytic converter body comprising a cylindrical jacket tube, and a plurality of radiating foil leaves having inner and outer ends, the foil leaves extending in adjacent curved paths and joined at the outer ends thereof to the jacket tube. The foil leaves define fluid passage cells between juxtaposed flat and corrugated leaf segments, and each of the foil leaves has at least one corrugated segment.

In still another aspect, the advantages and purpose of the invention are attained by a method of making a catalytic converter body, comprising the steps forming an elongated strip of metal foil having a series longitudinal segments coated with catalyst material and transverse bands of uncoated flat metal foil between at least some of the segments, the segments being alternately flat and corrugated to provide fluid passage cells when flat and corrugated segments are juxtaposed; folding each length to provide a leaf element having juxtaposed coated segments and at least one end of uncoated metal foil; and assembling a plurality of the leaf elements to provide a converter body having a multiplicity of fluid passage cells.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings, FIG. 1 is an isometric view depicting a continuous strip of foil from which the leaf assemblies of the present invention may be cut;

FIG. 2 is a side elevation illustrating an embodiment of the leaf assembly of the present invention;

FIG. 3 is an alternative embodiment of a leaf assembly in accordance with the invention;

FIG. 4 is a side elevation of a further leaf assembly embodiment of the invention;

DESCRIPTION OF THE PREFERRED EMBODIMENT

Figure 5:
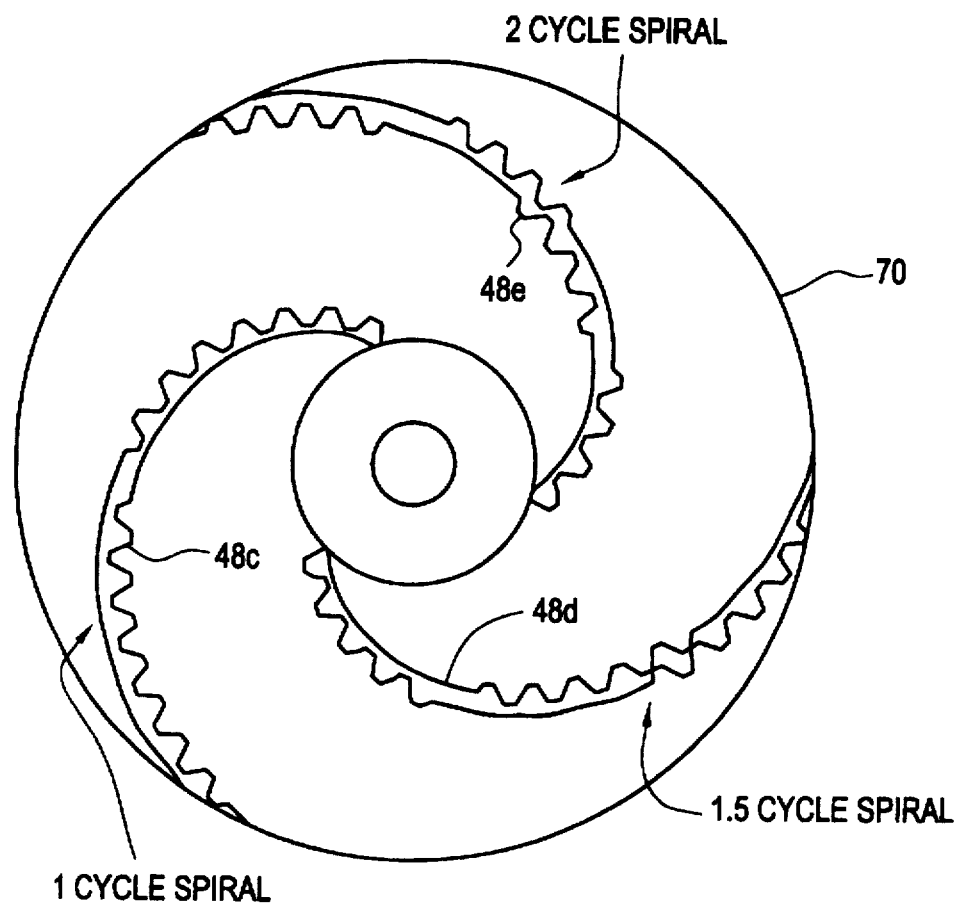
FIG. 5 is a schematic view illustrating a catalytic converter in which various configurations of leaf assemblies of the invention are shown.

Reference will now be made in detail to the present preferred embodiments of the invention, examples of which are illustrated in the accompanying drawings. Wherever possible, the same reference numbers will be used throughout the drawings to refer to the same or like parts.

The foil leaf arrangement may be constructed from "ferritic" stainless steel such as that described in U.S. Pat. No. 4,414,023 to Aggen. One usable ferritic stainless steel alloy contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV."

Another usable commercially available stainless steel metal alloy is identified as Haynes 214 alloy. This alloy and other useful nickeliferous alloys are described in U.S. Pat. No. 4,671,931 dated 9 Jun. 1987 to Herchenroeder et al. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein has a composition containing 22% chromium, 14% tungsten, 2% molybdenum, 0.10% carbon, a trace amount of lanthanum, balance nickel.

The ferritic stainless steels, and the Haynes alloys 214 and 230, all of which are considered to be stainless steels, are examples of high temperature resistive, oxidation resistant (or corrosion resistant) metal alloys that are useful for use in making the foil leaf core elements or leaves of the present invention, as well as the multicellular honeycomb converter bodies thereof. Suitable metal alloys must be able to withstand "high" temperature, e.g., from 900 degrees C. to 1200 degrees C. (1652 degrees F. to 2012 degrees F.) over prolonged periods.

Other high temperature resistive, oxidation resistant metal alloys are known and may be used herein. For most applications, and particularly automotive applications, these alloys are used as "thin" metal sheets, referred to as foil, that is, having a thickness of from about 0.001" to about 0.005", and preferably from 0.0015" to about 0.0037". The housings, or jacket tubes, hereof are of stainless steel and have a thickness of from about 0.03" to about 0.08", preferably, 0.04" to 0.06".

The multicellular converter bodies of the present invention preferably are formed from foil leaves precoated before assembly, such as described in U.S. Pat. No. 4,711,009 Cornelison et al. The converter bodies of the invention may be made solely of corrugated foil core elements which are non-nesting, or of alternating corrugated and flat foil core elements, or of other arrangements providing cells, flow passages, or a honeycomb structure when assembled. In the preferred embodiments, the foil leaves, which will be used as core elements, are precoated before assembly. The ends are masked or cleansed to maintain them free of any coating so as to facilitate brazing or welding to the housing or to an intermediate sleeve.

As indicated in U.S. Pat. No. 4,911,007, supra, the coating is desirably a refractory metal oxide, e.g., alumina, alumina/ceria, titania, titania/alumina, silica, zirconia, etc., and if desired, a catalyst may be supported on the refractory metal oxide coating. For use in catalytic converters, the catalyst is normally a noble metal, e.g., platinum, palladium, rhodium, ruthenium, indium, or a mixture of two or more of such metals, e.g., platinum/rhodium. The refractory metal oxide coating is generally applied in an amount ranging from about 10 mgs/square inch to about 80 mgs/square inch.

In some applications, corrugations preferably have an amplitude of from about 0.01 inch to about 0.15 inch, and a pitch of from about 0.02 inch to about 0.25 inch. The amplitude and pitch of the corrugations determine cell density, that is, the number of cells per unit of cross-sectional area in the converter, body. Typically, the cell density is expressed in cells per square inch (cpsi) and may vary from about 50 cpsi to 2000 cpsi.

Where a non-nesting corrugated foil leaf core element is used, the corrugations are generally patterned, e.g., a herringbone pattern or a chevron pattern, or skewed pattern. In a "skewed pattern", the corrugations are straight, but at an angle of from 3 degrees to about 10 degrees to the parallel marginal edges of the strips. The latter foil leaf core elements may be layered without nesting.

Where alternating corrugated and flat foil leaf core elements are used in a non-nesting arrangement to form the multicellular bodies, straight-through corrugations may be conveniently used, these exhibiting the lowest pressure drop at high flow in fluid flowing through the converter body. The straight-through corrugations are usually oriented along a line normal to the longitudinal marginal edges of the foil leaves, although, as indicated above, the corrugations may be oriented along a line oblique to the longitudinal marginal edges of the leaves.

To reduce stress, the "flat" foil leaf core elements preferably are lightly corrugated to have corrugations with an amplitude of from about 0.002" to about 0.01", e.g., 0.005" and a pitch of from about 0.02" to about 0.2", e.g., 0.1".

In accordance with the present invention, a layered metal sheet or foil leaf assembly for catalytic converters is provided in which at least two juxtaposed foil leaves, each having opposite ends to establish a leaf length and at least one corrugated leaf segment shorter than the leaf length, the juxtaposed foil leaves joined at at least one of the opposite ends. The juxtaposed foil leaves may be further joined to each other in at least one increment of length between the opposite ends. However, for most applications, the juxtaposed leaves are left unconnected between their ends to assure flexure symmetry in adjacent leaves. Although the following preferred embodiments provide a resulting body or assembly that can be inserted into a cylindrical jacket, bodies of other shapes may also be constructed according to the teachings of the present invention.

Presently preferred embodiments of the invention are illustrated in the drawings. In FIG. 1, a continuous strip of foil, designated generally by the reference number 40, is shown to include longitudinally spaced corrugated segments 42 spaced by flat segments 44 of substantially the same length as the corrugated segments of 42. The segments 42 and 44 are both coated with catalytic material and thus represent active or working portions of the foil. In the illustrated embodiment, a transverse band or short segment 46 of uncoated foil is positioned between each corrugated and flat segment. It is contemplated, however, that formation of the strip 40 may be programmed so that the transverse bands are formed at opposite ends of a series of the segments to be included in a single foil leaf assembly. These bands of uncoated foil may be effected by masking during the coating procedure or by removing coating material after the strip 40 is formed. The foil strip 40 may range in width from 2 to 8 inches. Although the strip may extend to any length in practice, the segments 42 and 44 are preferably of an equal length in the range of from 3 inches to 8 inches. Additionally, the combined length of one flat segment 44 and one corrugated segment 42 represents one cycle of foil length, as depicted in FIG. 1.

The strip 40 may be cut at the uncoated transverse bands 46 into lengths to any multiple of a ½ cycle. The cut lengths may then be juxtaposed, as shown in FIG. 2, so that the individual leaves between the cut ends are complementary, that is the flat segments 44 on one leaf lie against corrugated segments 42 on the other and vice versa.

The juxtaposed lengths of foil cut from the foil strip 40 and shown in FIG. 2 represent a foil leaf assembly 48 including two leaf elements or leaves 50 and 52 of a length determined by the distance between the opposite ends 54 and 56 of each leaf. In this embodiment, both ends of the two leaf elements are joined by welds 60, but it will be seen ensuing description of alternative embodiments, that two juxtaposed leaves in a leaf assembly may be joined at only one of such opposite ends.

Also as shown in FIG. 2, the two leaf elements are joined to each other between opposite ends by an intermediate weld 62 connecting overlying pairs of the transverse bands 46. If such intermediate welds 62 are used between opposite ends of the leaf assembly, the assembly is provided with additional strength, as a result of the interconnected individual leaves, significantly in excess of the strength of the same leaves left unconnected between their ends.

From the assembly 48 shown in FIG. 2, it will be appreciated that the two interconnected leaves 50 and 52 provide a plurality of fluid passage cells 43 extending transversely of the assembly. In addition, each leaf in the assembly contains at least one corrugated segment 42 along the length thereof. As a result, a measure of flexure is assured in each individual leaf along its length by the presence of that at least one corrugated segment 42.

In FIG. 3, an alternative embodiment of the foil leaf assembly 48a is shown in which the opposite ends of the leaf elements 50a and 52a are joined, but in this instance, by folds 54a and 56a of the strip material 40 at an uncoated transverse band 46. Also in FIG. 3, it will be noted that the leaf elements 50a and 52a form pairs of individual leaves joined at one end by the folds 54a, whereas the folds 56a at the other end connect each pairs of leaf elements 50a and 52a.

In the embodiment of FIG. 3, the individual leaf elements represent one cycle of the strip 40 described above with reference to FIG. 1. In FIG. 4, a further alternative embodiment of a leaf assembly of 48b is shown in which the length of the leaf elements represent 1½ cycles of the strip 40.

In the described embodiments, the complementing pairs of individual leaf elements are "non-nesting" in that corrugated segments are paired with flat segments to provide the fluid passage cells. Also, the corrugations of the corrugated segments 42 are perpendicular to the longitudinal direction of the strip 40, thus providing highly efficient fluid flow passageways or cells.

In accordance with the present invention, the metal foil leaf assembly described with reference FIGS. 1–4 is advantageously incorporated in a catalytic converter body which the fluid passage cell defining leaves are joined to and extend from a jacket tube to a central inner region at which the inner ends of the leaves are either unconnected or connected to a pliant central core section of the converter body.

Figure 6:
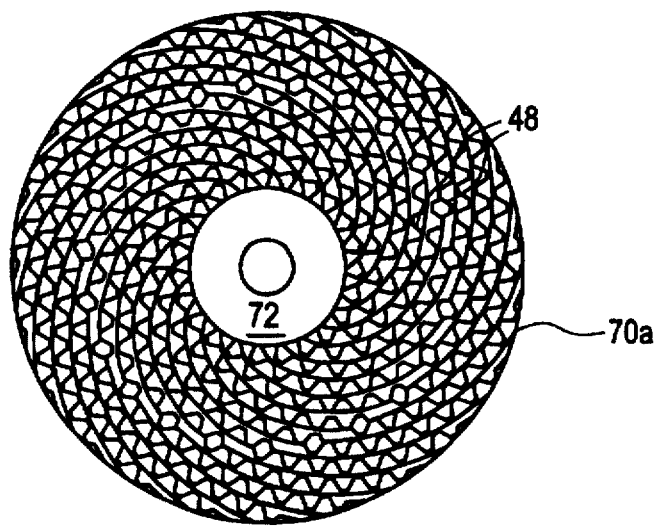
FIG. 6 is an end view of a catalytic converter including the plurality of leaf assemblies of the present invention.

In FIGS. 5 and 6 of the drawings, a catalytic converter body is shown in which the foil leaf assembly of the invention is embodied in radiating layers extending in involute or spiral paths between a peripheral jacket and an open central region. FIG. 5 is a largely schematic illustration depicting spiral leaf assemblies 48c, 48d and 48e of various cycle configurations in a converter body 70. In particular, the leaf assembly 48c is configured of one foil cycle, the leaf assembly 48d is 1.5 foil cycles, and the leaf assembly 48e contains two foil cycles. All of the illustrated leaf assemblies are of the same length.

In FIG. 6, a complete converter body 70a is shown. To form the converter body 70a shown in FIG. 6, ends of the leaves at the outer periphery of the converter body representing outer ends of each leaf assembly 48 may be interconnected, either to each other as a strip, or joined such as by welding or brazing to a separate continuous foil strip from which the inner ends of the leaf assemblies extend freely. The outer ends of the leaf assemblies are then closed into a circle while the leaves are formed generally into the spiral paths shown in the drawings. The closed strip of leaf assemblies is then inserted into a cylindrical jacket and brazed in place. The central region 72 of the converter body may then be filled with a central core of a catalytic material defining flow passageway cells.

In an alternative method, the inner ends of the foil assemblies 48 are connected to a sheet of foil with the outer ends of the assemblies initially unconnected. The foil may be wrapped about a core unit occupying the central region 72 and the assembly placed in a cylindrical jacket. Again, the outer ends of the leaf assemblies 48 may be brazed to the jacket tube.

Figure 7:
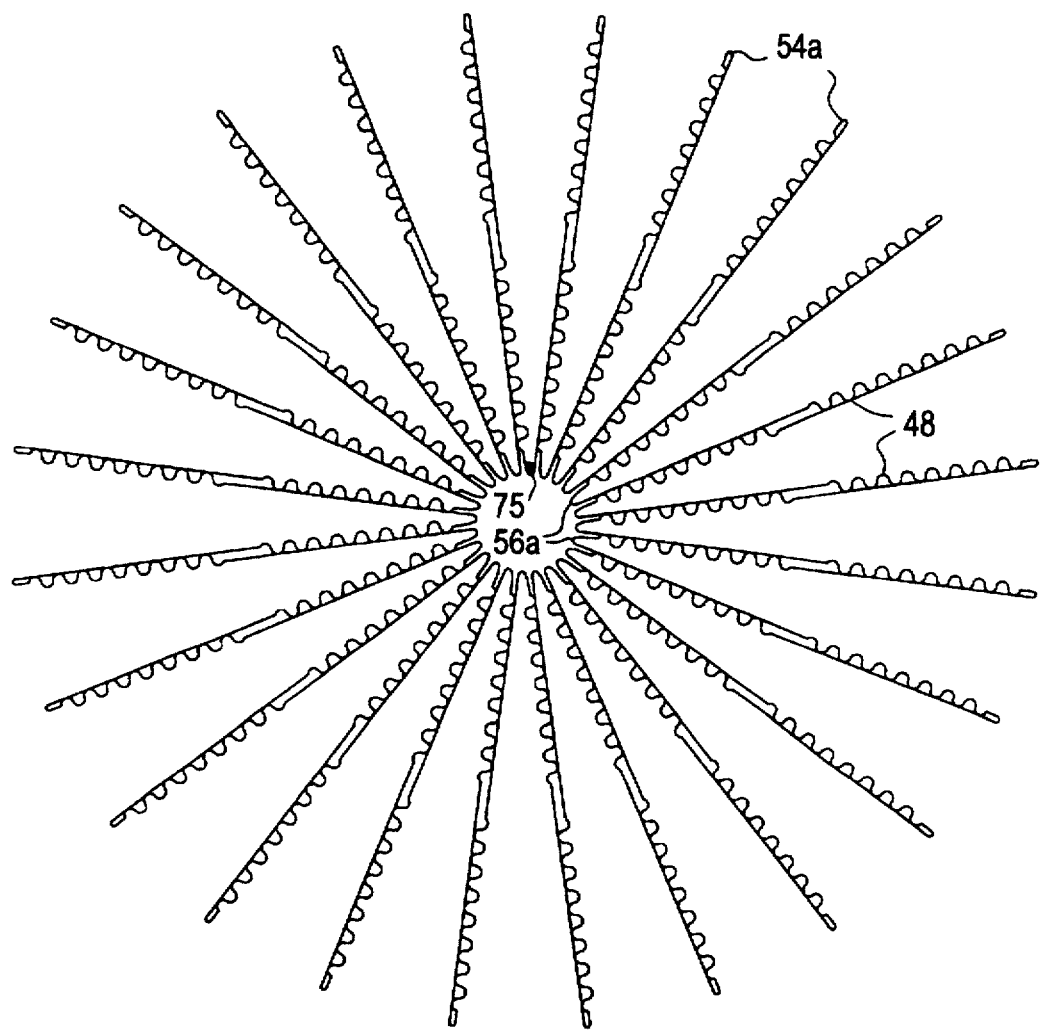
FIG. 7 is an end view illustrating a star shaped assembly of the leaf assemblies of the present invention.

In FIG. 7, a plurality of leaf pairs are initially assembled by folding consecutive cycles of the foil strip 40 in the manner depicted in FIG. 3 of the drawings. As described above with reference to FIG. 3, each of the leaf elements shown in FIG. 7 is joined at one end as a leaf pair by a fold 54a, and the respective leaf pairs are joined their opposite ends by folds 56a. The leaf pairs are formed into a circular array about the folds 56a and the two cut ends of the strip 40 are joined at a weld 75 to form the star shaped configuration of leaf assemblies 48 as shown in FIG. 7.

The star shaped assembly of leaves shown in FIG. 7 is subsequently formed into a leaf assembly for a converter body to have the spiral form configuration similar to that described with reference to FIG. 6. This shaping of the star form assembly of leaves is accomplished by apparatus and method steps depicted in FIGS. 8–12 of the drawings.

Figure 8:
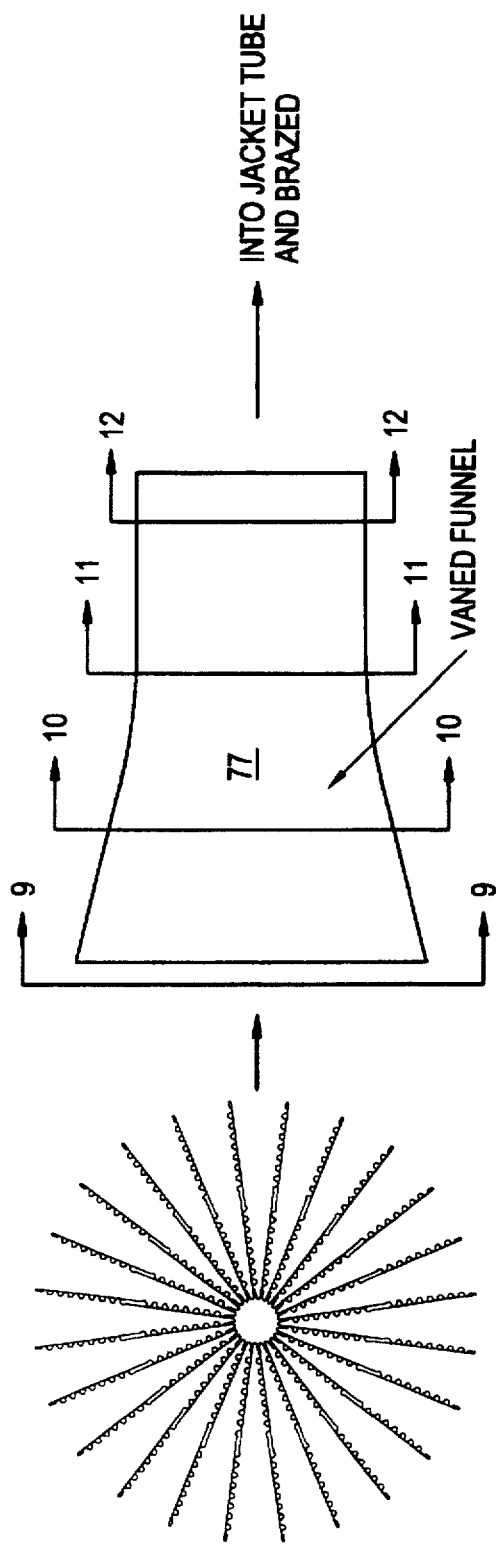
FIG. 8 is an exploded view depicting the assembly of FIG. 7 with a forming jig by which it is formed into a leaf assembly for a catalytic converter.
Figure 12:
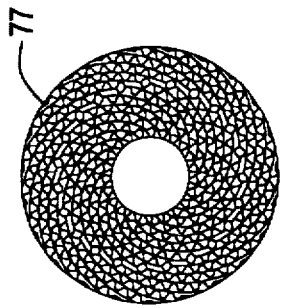
FIG. 12 is a cross-section on lines 12—12 of FIG. 8.
Figure 11:
FIG. 11 is a cross-section on lines 11—11 of FIG. 8.
Figure 10:
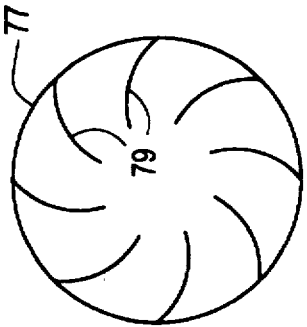
FIG. 10 is a cross-section on lines 10—10 of FIG. 8.
Figure 9:
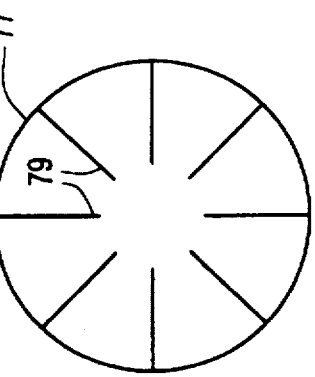
FIG. 9 is an end view as seen on lines 9—9 of FIG. 8.

As depicted in FIG. 8, the star shaped assembly of leaves is rotated 90° from the plane of the figure and advanced axially into a fixture 77 having internal radiating vanes 79 as depicted in FIGS. 9–12. Thus, the radiating leaf assemblies of the star shaped assembly will be received between the initially purely radial vanes 79 as shown in FIG. 9. As the assembly is advanced through the fixture, the diameter of the fixture gradually reduces and the vanes 79 form the radiating leaves of the star shaped assembly into gradually tightened spiral-form curves. As the star shaped assembly exits the fixture, as shown in FIG. 12, it is configured in spiral form paths similar to that shown in FIG. 6. The formed leaf unit is then fed axially into a cylindrical body jacket and brazed in place.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for making a catalyst support body for a catalytic converter comprising:

forming an elongated strip of metal foil having a series of alternating flat and corrugated segments along the length of the strip and transverse bands of flat metal foil between at least some of said flat and corrugated segments, wherein said flat and corrugated segments are coated with a catalyst and the transverse bands of flat metal foil are not coated with a catalyst;

folding the strip along at least one transverse band to provide a plurality of adjacent foil leaf elements having two opposite ends said foil leaf elements having at least one flat catalyst coated segment and at least one corrugated catalyst coated segment along the length of the foil elements, at least one end of the foil leaf elements having a flat metal foil region which is not coated with a catalyst;

assembling a plurality of the adjacent foil leaf elements to form a catalyst support body having a central region and a periphery, said foil leaf elements being assembled to radiate in adjacent curved paths such that one end of the foil leaf elements extend outwardly to the periphery of the body and the opposite end of the foil leaf elements extend into the central region of the body, the flat and corrugated segments of the foil leaf elements defining fluid passage cells between alternating flat and corrugated segments of adjacent foil leaf elements.

2. A method of making a catalyst support body for a catalytic converter comprising forming an elongated metal foil strip with two opposite ends, the strip having a series of longitudinal foil cycles between opposite ends of the strips, each cycle including alternating flat and corrugated segments coated with catalyst and transverse bands of flat metal foil having no catalyst coating located at the beginning and end of each cycle;

folding the strip along at least one transverse band of a cycle to provide a stack of interconnected metal foil layers having alternating flat and corrugated catalyst coated segments along the length of the metal foil layers, the stack of interconnected metal foil layers having two ends, both ends of the strip terminating on the same end of the stack;

arranging the stack of interconnected metal foil layers to provide a plurality of interconnected foil layers shaped into a star configuration wherein the ends of the folded strip meet to complete the configuration;

joining the ends of the strip; and assembling the star configured foil layers into a honeycomb body having a central region, the foil layers extending outwardly in radiating curved paths from the central region of the honeycomb body, the foil layers having flat and corrugated segments along their length, the flat and corrugated segments of the foil layers defining fluid passage cells between alternating corrugated and flat segments of adjacent foil layers.

\* \* \* \* \*